United States Patent
Cao et al.

(10) Patent No.: US 10,368,086 B2
(45) Date of Patent: *Jul. 30, 2019

(54) IMAGE CODING/DECODING METHOD, DEVICE, AND SYSTEM

(71) Applicants: Huawei Technologies Co., Ltd., Shenzhen (CN); Tsinghua University, Beijing (CN)

(72) Inventors: Xiaoran Cao, Beijing (CN); Yun He, Beijing (CN); Xiaozhen Zheng, Shenzhen (CN); Jianhua Zheng, Beijing (CN)

(73) Assignees: Huawei Technologies Co., Ltd., Shenzhen (CN); Tsinghua University, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/032,748

(22) Filed: Jul. 11, 2018

(65) Prior Publication Data

US 2018/0324453 A1 Nov. 8, 2018

Related U.S. Application Data

(63) Continuation of application No. 15/261,437, filed on Sep. 9, 2016, now Pat. No. 10,027,974, which is a (Continued)

(30) Foreign Application Priority Data

May 19, 2014 (CN) .......................... 2014 1 0212310

(51) Int. Cl.
*H04N 19/517* (2014.01)
*H04N 19/172* (2014.01)
(Continued)

(52) U.S. Cl.
CPC ........... *H04N 19/517* (2014.11); *H04N 19/12* (2014.11); *H04N 19/147* (2014.11);
(Continued)

(58) Field of Classification Search
USPC ...................................... 375/240.12
See application file for complete search history.

(56) References Cited

U.S. PATENT DOCUMENTS

| 6,486,881 B2 | 11/2002 | Hunter et al. |
| 8,428,133 B2 * | 4/2013 | Ye ........................ H04N 19/197 375/240.14 |

(Continued)

FOREIGN PATENT DOCUMENTS

| CN | 101180675 A | 5/2008 |
| CN | 102572426 A | 7/2012 |

(Continued)

OTHER PUBLICATIONS

Cao et al, Singular vector decomposition based adaptive transform for motion compensation residuals, IEEE International Conference on Image Processing (ICIP), ICIP 2014, Institute of Electrical and Electronics Engineers, New York, New York (2014).

(Continued)

*Primary Examiner* — Xuemei G Chen
(74) *Attorney, Agent, or Firm* — Leydig, Voit & Mayer, Ltd.

(57) ABSTRACT

The present application discloses an image coding/decoding method, device, and system, where an encoder performs singular vector decomposition on a prediction block corresponding to a to-be-coded image block, to obtain eigenvector matrices U and V of the prediction block; and performs coding processing on residual data according to the eigenvector matrices U and V of the prediction block, where the residual data is a difference between a pixel value of the (Continued)

to-be-coded image block and a pixel value of the corresponding prediction block. This can reduce identifier load of a coded bit stream.

15 Claims, 8 Drawing Sheets

Related U.S. Application Data continuation of application No. PCT/CN2015/078272, filed on May 5, 2015.

(51) Int. Cl.
*H04N 19/176* (2014.01)
*H04N 19/48* (2014.01)
*H04N 19/147* (2014.01)
*H04N 19/12* (2014.01)
*H04N 19/463* (2014.01)

(52) U.S. Cl.
CPC ......... *H04N 19/172* (2014.11); *H04N 19/176* (2014.11); *H04N 19/48* (2014.11); *H04N 19/463* (2014.11)

(56) References Cited

U.S. PATENT DOCUMENTS

| | | | |
|---|---|---|---|
| 9,883,207 B2* | 1/2018 | Misra | H04N 19/102 |
| 2003/0103679 A1 | 6/2003 | Etoh et al. | |
| 2009/0281798 A1 | 11/2009 | Den et al. | |
| 2010/0195715 A1 | 8/2010 | Liu et al. | |
| 2011/0170594 A1 | 7/2011 | Budagavi et al. | |
| 2012/0121009 A1 | 5/2012 | Lu et al. | |
| 2013/0051453 A1 | 2/2013 | Sole et al. | |
| 2013/0071038 A1 | 3/2013 | Kondo | |
| 2013/0094581 A1 | 4/2013 | Tanizawa et al. | |
| 2013/0128972 A1* | 5/2013 | Yamaguchi | H04N 19/61 375/240.12 |
| 2013/0151575 A1 | 6/2013 | Fong et al. | |
| 2013/0177077 A1* | 7/2013 | Yeo | H04N 19/00781 375/240.12 |
| 2013/0287094 A1 | 10/2013 | Song et al. | |
| 2014/0044164 A1 | 2/2014 | Gu et al. | |
| 2015/0104110 A1 | 4/2015 | Balestri et al. | |
| 2016/0073114 A1 | 3/2016 | Kawamura et al. | |

FOREIGN PATENT DOCUMENTS

| | | |
|---|---|---|
| CN | 102843572 A | 12/2012 |
| CN | 102891999 A | 1/2013 |
| CN | 103237205 A | 8/2013 |
| CN | 103299639 A | 9/2013 |
| CN | 103338379 A | 10/2013 |
| CN | 103778919 A | 5/2014 |
| CN | 103974076 A | 8/2014 |
| EP | 2202986 A1 | 6/2010 |
| JP | H06139345 A | 5/1994 |
| JP | 2002314428 A | 10/2002 |
| JP | 2002315006 A | 10/2002 |
| JP | 2005167655 A | 6/2005 |
| JP | 2011234020 A | 11/2011 |
| JP | 2012533963 A | 12/2012 |
| JP | 2014195145 A | 10/2014 |
| KR | 20130090322 A | 8/2013 |
| WO | 2011112239 A1 | 9/2011 |

OTHER PUBLICATIONS

Kawamura et al, "In-loop colour-space-tRansform coding based on integered SVD for HEVC range extensions," Picture Coding Symposium (PCS), PCS 2013, Institute of Electrical and Electronics Engineers, New York, New York (2013).
"Series H: Audiovisual and Multimedia Systems Infrastructure of audiovisual services—Coding of moving video, Advanced video coding for generic audiovisual services," TITU-T H.264, International Telecommunication Union, Geneva, Switzerland (Feb. 2014).
Series H: Audiovisual and Multimedia Systems Infrastructure of audiovisual services—Coding of moving video, High efficiency video coding, ITU-T H.265, International Telecommunication Union, Geneva, Switzerland (Apr. 2013).
Biswas et al:"improved H.264-based video coding using an adaptive transform", 2010 17th IEEE International Conference on Image Processing (ICIP 2010); XP31813610, Institute of Electrical and Electronics Engineers, New York, New York (Sep. 26-29, 2010).
Richardson et al.,:"dynamic transform replacement in an H.264 codec", 15th IEEE International Conference on Image Processing: ICIP 2008; XP31374450, Institute of Electrical and Electronics Engineers, New York, New York (2008).
AASE et al,"A critique of svd-based image coding systems", Proceedings of the 1999 IEEE International Symposium on Circuits and Systems/ISCAS, XP10341120, Institute of Electrical and Electronics Engineers, New York, New York (1999).

* cited by examiner

IMAGE CODING/DECODING METHOD, DEVICE, AND SYSTEM

CROSS-REFERENCE TO RELATED APPLICATIONS

This application is a continuation of U.S. patent application Ser. No. 15/261,437, filed on Sep. 9, 2016, which is a continuation of International Application No. PCT/CN2015/078272, filed on May 5, 2015, which claims priority to Chinese Patent Application No. 201410212310.X, filed on May 19, 2014. All of the afore-mentioned patent applications are hereby incorporated by reference in their entireties.

TECHNICAL FIELD

Embodiments of the present application relate to the field of image processing technologies, and in particular, to an image coding/decoding method, device, and system.

BACKGROUND

Video data may be compressed by using, for example, an intra-frame compression method or an inter-frame compression method to minimize bandwidth required for transmitting the video data. The inter-frame compression method is generally based on motion estimation. A process of compressing, coding, and decoding an image by using the inter-frame compression method specifically includes the following: An encoder divides a to-be-coded image block into several image sub-blocks of a same size; for each of the image sub-blocks, searches a reference image for an image block that best matches the current image sub-block and uses the image block as a prediction block; subtracts a corresponding pixel value of the prediction block from that of the current image sub-block to obtain a residual; performs entropy coding on a value obtained after the residual is transformed and quantized; and finally sends both a bit stream obtained from the entropy coding and motion vector information to a decoder, where the motion vector information indicates a position difference between the current image sub-block and the prediction block. The decoder of the image first performs entropy decoding on the obtained entropy-coded bit stream, to obtain the corresponding residual and the corresponding motion vector information; obtains a corresponding matched image block (that is, the foregoing prediction block) from the reference image according to the motion vector information; and then obtains a value of each pixel point in the current image sub-block by adding a value of each pixel point in the matched image block and a value of a corresponding pixel point in the residual. For the intra-frame compression method (also referred to as an intra-frame prediction method), a process of compressing, coding, and decoding an image by using the intra-frame compression method specifically includes: dividing an image block into several image sub-blocks, obtaining a reference image block for each of the image sub-blocks according to content of a current frame of image, obtaining a residual of an image sub-block according to the reference image block, performing entropy coding on a value obtained after the residual is transformed and quantized, and writing a result of the coding into a bit stream. A decoder of the image first performs entropy decoding on the obtained entropy-coded bit stream to obtain the corresponding residual and the image sub-blocks into which the image block is divided, obtains the reference image block according to the content of the current frame of image, and obtains a value of each pixel point in a current image sub-block according to a residual between the reference image block and the current image sub-block.

Further, to remove redundancy information from the foregoing image block and improve coding efficiency, in the foregoing coding/decoding technology, the encoder may use, for example, a singular vector decomposition (SVD) technology to perform SVD decomposition on residual data, to obtain an eigenvector matrix (for example, a matrix U and a matrix V), and transform the residual data by using the matrix U and the matrix V to obtain a transform coefficient. However, the decoder cannot perform SVD decomposition on the residual data. Therefore, the encoder needs to transmit, to the decoder, the matrix U and the matrix V that are obtained by performing SVD decomposition on the residual data. Alternatively, several sets of matrices U and V are determined in a coding/decoding system, the encoder transmits an index value corresponding to a matrix U and a matrix V and the decoder obtains the corresponding matrix U and matrix V by acquiring the index value. In this way, during decoding, the decoder can perform inverse transformation on the transform coefficient by using the matrix U and the matrix V to obtain the residual data, and perform a decoding operation on the residual data.

Therefore, in the existing SVD decomposition technology, the encoder needs to transmit, to the decoder, the matrix U and the matrix V that are obtained by performing SVD decomposition on the residual data, or needs to transmit index values of the several sets of matrices U and V to the decoder. This increases identifier load of a coded bit stream and thereby reduces the coding efficiency.

SUMMARY

Embodiments of the present application provide an image coding/decoding method, device, and system to solve a problem of a reduction in coding efficiency, which results from an increase of identifier load of a coded bit stream because an encoder needs to transmit, to a decoder, a matrix U and a matrix V that are obtained by means of SVD decomposition or needs to transmit index values of several sets of matrices U and V to a decoder in an existing SVD decomposition technology.

According to a first aspect, an image coding method is provided, including:

performing singular vector decomposition on a prediction block corresponding to a to-be-coded image block, to obtain eigenvector matrices U and V of the prediction block; and performing coding processing on residual data according to the eigenvector matrices U and V of the prediction block, where the residual data is a difference between a pixel value of the to-be-coded image block and a pixel value of the corresponding prediction block.

Optionally, the performing coding processing on residual data according to the eigenvector matrices U and V of the prediction block includes:

performing first transformation on the residual data by using the eigenvector matrices U and V of the prediction block to obtain a first transform coefficient of the residual data, and performing coding processing on the first transform coefficient.

Optionally, before the performing coding processing on the first transform coefficient, the method further includes:

performing second transformation on the residual data by using a two-dimensional transform matrix to obtain a second transform coefficient of the residual data.

Optionally, after the obtaining a second transform coefficient of the residual data, the method includes:

comparing performance of the first transform coefficient with that of the second transform coefficient; and if the performance of the first transform coefficient is better than that of the second transform coefficient, coding a transform flag and the first transform coefficient, where a value of the transform flag is a first value used to indicate that an encoder transforms the residual data by using the eigenvector matrices U and V of the prediction blocks; or if the performance of the first transform coefficient is poorer than that of the second transform coefficient, coding a transform flag and the second transform coefficient, where a value of the transform flag is a second value used to indicate that an encoder transforms the residual data by using the two-dimensional transform matrix.

Optionally, the method further includes:

performing, by the encoder, singular vector decomposition on the residual data to obtain eigenvector matrices U and V of the residual data;

acquiring information about a difference between the eigenvector matrix U of the residual data and the eigenvector matrix U of the prediction block and information about a difference between the eigenvector matrix V of the residual data and the eigenvector matrix V of the prediction block according to the eigenvector matrices U and V of the residual data and the eigenvector matrices U and V of the prediction block;

coding the information about the difference between the eigenvector matrices U and the information about the difference between the eigenvector matrices V; and performing third transformation on the residual data by using the eigenvector matrices U and V of the residual data to obtain a third transform coefficient of the residual data, and performing coding processing on the third transform coefficient.

Optionally, after the obtaining a third transform coefficient of the residual data, the method includes:

comparing performance of the second transform coefficient with that of the third transform coefficient; and if the performance of the third transform coefficient is better than that of the second transform coefficient, coding a transform flag, the third transform coefficient, the information about the difference between the eigenvector matrices U and the information about the difference between the eigenvector matrices V, where a value of the transform flag is a third value used to indicate that the encoder transforms the residual data by using the eigenvector matrices U and V of the residual data; or if the performance of the third transform coefficient is poorer than that of the second transform coefficient, coding a transform flag and the second transform coefficient, where a value of the transform flag is a second value used to indicate that the encoder transforms the residual data by using the two-dimensional transform matrix.

Optionally, the transform flag may be a 1-bit flag, and the first value, the second value, and the third value may be 0 or 1.

According to a second aspect, an image decoding method is provided, including:

performing, by a decoder, singular vector decomposition on a prediction block corresponding to a to-be-decoded image block, to obtain eigenvector matrices U and V of the prediction block; and obtaining a transform coefficient, and performing decoding processing on the transform coefficient according to the eigenvector matrices U and V of the prediction block.

Optionally, the performing decoding processing on the transform coefficient according to the eigenvector matrices U and V of the prediction block includes:

performing inverse transformation on the transform coefficient by using the eigenvector matrices U and V of the prediction block to obtain residual data; and obtaining an image block by using the residual data.

Optionally, before the obtaining an image block by using the residual data, method further includes:

decoding a transform flag, where if a value of the transform flag is a first value, inverse transformation is performed on the transform coefficient by using the eigenvector matrices U and V of the prediction block.

Optionally, before the obtaining an image block by using the residual data, the method further includes:

decoding a transform flag, where when the transform flag equals a second value, inverse transformation is performed on the transform coefficient by using a two-dimensional transform matrix to obtain the residual data.

Optionally, the method further includes:

decoding difference information of the eigenvector matrix U and difference information of the eigenvector matrix V;

acquiring the eigenvector matrices U and V according to the eigenvector matrices U and V of the prediction block that are obtained after the singular vector decomposition and the decoded difference information of the eigenvector matrix U and the decoded difference information of the eigenvector matrix V; and performing inverse transformation on the transform coefficient by using the eigenvector matrices U and V to obtain residual data.

Optionally, before the decoding difference information of the eigenvector matrix U and difference information of the eigenvector matrix V, the method further includes:

decoding the transform flag, where when the transform flag equals a third value, inverse transformation is performed on the transform coefficient by using the eigenvector matrices U and V; or when the transform flag equals a second value, performing inverse transformation on the transform coefficient by using the two-dimensional transform matrix.

According to a third aspect, an image coding device is provided, including:

an acquiring module, configured to perform singular vector decomposition on a prediction block corresponding to a to-be-coded image block, to obtain eigenvector matrices U and V of the prediction block; and a coding module, configured to perform coding processing on residual data according to the eigenvector matrices U and V of the prediction block, where the residual data is a difference between a pixel value of the to-be-coded image block and a pixel value of the corresponding prediction block.

Optionally, the coding module is specifically configured to:

perform first transformation on the residual data by using the eigenvector matrices U and V of the prediction block to obtain a first transform coefficient of the residual data, and perform coding processing on the first transform coefficient.

Optionally, the image coding device further includes:

a transformation module, configured to perform second transformation on the residual data by using a two-dimensional transform matrix to obtain a second transform coefficient of the residual data.

Optionally, the image coding device further includes:

a comparison module, configured to compare performance of the first transform coefficient with that of the second transform coefficient; and the coding module is specifically configured to: if the performance of the first transform coefficient is better than that of the second transform coefficient, code a transform flag and the first transform coefficient, where a value of the transform flag is a first value used to indicate that an encoder transforms the residual data by using the eigenvector matrices U and V of the prediction blocks; or the coding module is specifically configured to: if the performance of the first transform coefficient is poorer than that of the second transform coefficient, code a transform flag and the second transform coefficient, where a value of the transform flag is a second value used to indicate that an encoder transforms the residual data by using the two-dimensional transform matrix.

Optionally, the acquiring module is further configured to perform singular vector decomposition on the residual data to obtain eigenvector matrices U and V of the residual data;

the acquiring module is further configured to acquire information about a difference between the eigenvector matrix U of the residual data and the eigenvector matrix U of the prediction block and information about a difference between the eigenvector matrix V of the residual data and the eigenvector matrix V of the prediction block according to the eigenvector matrices U and V of the residual data and the eigenvector matrices U and V of the prediction block;

the coding module is further configured to code the information about the difference between the eigenvector matrices U and the information about the difference between the eigenvector matrices V; and the coding module is further configured to perform third transformation on the residual data by using the eigenvector matrices U and V of the residual data to obtain a third transform coefficient of the residual data, and perform coding processing on the third transform coefficient.

Optionally, the comparison module is further configured to compare performance of the second transform coefficient and that of the third transform coefficient;

the coding module is further configured to: if the performance of the third transform coefficient is better than that of the second transform coefficient, code a transform flag, the third transform coefficient, the information about the difference between the eigenvector matrices U, and the information about the difference between the eigenvector matrices V, where a value of the transform flag is a third value used to indicate that an encoder transforms the residual data by using the eigenvector matrices U and V of the residual data; or the coding module is further configured to: if the performance of the third transform coefficient is poorer than that of the second transform coefficient, code a transform flag and the second transform coefficient, where a value of the transform flag is a second value used to indicate that an encoder transforms the residual data by using the two-dimensional transform matrix.

Optionally, the transform flag may be a 1-bit flag, and the first value, the second value, and the third value may be 0 or 1.

According to a fourth aspect, an image decoding device is provided, including:

an acquiring module, configured to perform singular vector decomposition on a prediction block corresponding to a to-be-decoded image block, to obtain eigenvector matrices U and V of the prediction block; and a decoding module, configured to obtain a transform coefficient, and perform decoding processing on the transform coefficient according to the eigenvector matrices U and V of the prediction block.

Optionally, the decoding module is specifically configured to:

perform inverse transformation on the transform coefficient by using the eigenvector matrices U and V of the prediction block to obtain residual data; and obtain an image block by using the residual data.

Optionally, the image decoding device further includes:

an inverse transformation module, configured to decode a transform flag, where if a value of the transform flag is a first value, inverse transformation is performed on the transform coefficient by using the eigenvector matrices U and V of the prediction block.

Optionally, the inverse transformation module is further configured to: decode a transform flag, where when the transform flag equals a second value, inverse transformation is performed on the transform coefficient by using a two-dimensional transform matrix to obtain the residual data.

Optionally, the decoding module is further configured to decode difference information of the eigenvector matrix U and difference information of the eigenvector matrix V;

the acquiring module is further configured to acquire the eigenvector matrices U and V according to the eigenvector matrices U and V of the prediction block that are obtained after the singular vector decomposition and the decoded difference information of the eigenvector matrix U and the decoded difference information of the eigenvector matrix V; and the inverse transformation module is further configured to perform inverse transformation on the transform coefficient by using the eigenvector matrices U and V to obtain residual data.

Optionally, the inverse transformation module is further configured to decode the transform flag, where when the transform flag equals a third value, inverse transformation is performed on the transform coefficient by using the eigenvector matrices U and V; or when the transform flag equals a second value, inverse transformation is performed on the transform coefficient by using the two-dimensional transform matrix.

According to a fifth aspect, an image coding/decoding system is provided, including:

the image coding device according to the third aspect and the image decoding device according to the fourth aspect.

In the embodiments of the present application, an encoder performs singular vector decomposition on a prediction block corresponding to a to-be-coded image block, to obtain eigenvector matrices U and V of the prediction block; and performs coding processing on residual data according to the eigenvector matrices U and V of the prediction block, and sends the residual data obtained after the coding processing to a decoder, where the residual data is a difference between a pixel value of the to-be-coded image block and a pixel value of the corresponding prediction block. Therefore, in the embodiments, the encoder does not need to transmit, to the decoder, a matrix U and a matrix V that are obtained by performing SVD decomposition on the residual data, and also does not need to transmit index values of several sets of matrices U and V to the decoder. This reduces identifier load of a coded bit stream.

Correspondingly, the decoder only needs to perform singular vector decomposition on a prediction block corresponding to a to-be-decoded image block, to obtain eigenvector matrices U and V of the prediction block; perform, by using the eigenvector matrices U and V of the prediction block, inverse transformation on residual data on which the encoder performs coding processing, to obtain the residual data; and acquire a decoded image block by using the residual data. This can improve coding/decoding efficiency.

BRIEF DESCRIPTION OF DRAWINGS

To describe the technical solutions in the embodiments of the present application or in the prior art more clearly, the following briefly describes the accompanying drawings required for describing the embodiments or the prior art. Apparently, the accompanying drawings in the following description show some embodiments of the present application, and a person of ordinary skill in the art may still derive other drawings from these accompanying drawings without creative efforts.

DESCRIPTION OF EMBODIMENTS

Figure 1:
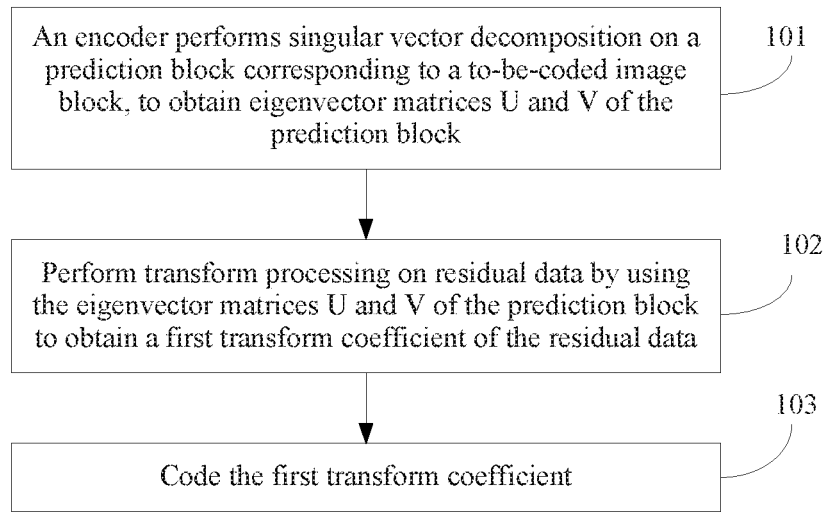
FIG. 1 is a schematic flowchart of an image coding method according to an embodiment of the present application.

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

In video coding/decoding standards, for example, Moving Picture Experts Group (MPEG) and Advanced Video Coding (H.264/AVC), an image block, also called a macro block, is referred to as a coding unit in the High Efficiency Video Coding (HEVC) standard. An image block can be divided into several image sub-blocks, and sizes of these, image sub-blocks may be 64×64, 64×32, 32×64, 32×32, 32×16, 16×32, 16×16, 16×8, 8×16, 8×8, 8×4, 4×8, 4×4, or the like. Motion estimation and motion compensation is performed on the image sub-blocks in the foregoing sizes. An encoder of an image needs to send, to a decoder of the image, a code word that identifies an image block partitioning manner, so that the decoder of the image learns the partitioning manner of the encoder of the image and determines, according to the partitioning manner and motion vector information, prediction blocks corresponding to the image sub-blocks. In addition, intra-frame prediction may also be performed on the image sub-blocks in the foregoing sizes. An encoder of an image needs to send, to a decoder of the image, a code word that identifies an image block partitioning manner, so that the decoder of the image learns the partitioning manner of the encoder of the image and determines, according to the partitioning manner, prediction blocks corresponding to the image sub-blocks. In the video coding/decoding standards, these image sub-blocks are, for example, all rectangular blocks of N×M (both N and M are integers greater than 0), where N and M have a multiple relationship. The foregoing prediction block may be used in an intra-frame prediction or inter-frame prediction technology.

An application idea used in the embodiments of the present application is as follows:

In a video coding/decoding system, an encoder and a decoder generally need to predict a to-be-coded/decoded image block (which may also be referred to as an image sub-block) to obtain a prediction block corresponding to the image block.

For inter-frame prediction, the encoder obtains, by means of a motion search, a motion vector of a to-be-coded image block, and a data block to which the motion vector points is a prediction block (which may also be referred to as an inter-frame prediction block) corresponding to the image block; similarly, the decoder may also obtain a same inter-frame prediction block according to a motion vector of a to-be-decoded image block.

For intra-frame prediction, both the encoder and the decoder may construct, according to data adjacent to a to-be-coded/decoded image block, a prediction block (which may also be referred to as an intra-frame prediction block) corresponding to the image block.

Both the foregoing inter-frame prediction block and intra-frame prediction block have a similar texture structure as data of the image block. Residual data obtained by subtracting a pixel value of the prediction block from that of the image block also has a similar texture structure as the image block and the prediction block. Therefore, eigenvector matrices U and V that are obtained by performing SVD decomposition on the prediction block also have a degree of similarity with eigenvector matrices U and V that are obtained by performing SVD decomposition on the residual data. Further, better transform performance can also be obtained by performing transform processing on the residual data by using the eigenvector matrices U and V that are obtained by performing SVD decomposition on the prediction block.

Further, both the encoder and the decoder can acquire the prediction block corresponding to the image block. Therefore, in this embodiment, the eigenvector matrices U and V that are obtained by the encoder by performing SVD decomposition on the prediction block do not need to be coded and transmitted to the decoder. The decoder can obtain the eigenvector matrices U and V as well by performing SVD decomposition on the prediction block. In this way, an identifier overhead of a coded bit stream is avoided, and coding/decoding efficiency can be further improved without affecting flexibility of coding/decoding.

An image coding method for an encoder n an embodiment of the present application includes: performing singular vector decomposition on a prediction block corresponding to a to-be-coded image block, to obtain eigenvector matrices U and V of the prediction block; and performing coding processing on residual data according to the eigenvector matrices U and V of the prediction block, where the residual data is a difference between a pixel value of the to-be-coded image block and a pixel value of the corresponding prediction block.

An image decoding method for a decoder in an embodiment of the present application includes: performing, by the decoder, singular vector decomposition on a prediction block corresponding to a to-be-decoded image block, to obtain eigenvector matrices U and V of the prediction block; and obtaining a transform coefficient, and performing decoding processing on the transform coefficient according to the eigenvector matrices U and V of the prediction block.

It should be noted that a transform flag used in an embodiment of the present application may be, for example, a 1-bit flag. A first value, a second value, a third value, and a fourth value described in the following may be 0 or 1.

The following describes specific implementation manners of the embodiments of the present application in detail by using the accompany drawings:

FIG. 1 is a schematic flowchart of an image coding method according to an embodiment of the present application. As shown in FIG. 1, the method includes:

101. An encoder performs singular vector decomposition on a prediction block corresponding to a to-be-coded image block, to obtain eigenvector matrices U and V of the prediction block.

For an inter-frame prediction technology, the prediction block corresponding to the to-be-coded image block may be determined according to a partitioning manner of the image block and a motion vector; for intra-frame prediction, the prediction block corresponding to the to-be-coded image block may be determined according to a partitioning manner of the image block, and details are not repeatedly described herein.

The singular vector decomposition technology used in this embodiment of the present application may be, for example, an SVD decomposition technology in the prior SVD decomposition is performed on individual pieces of residual data, that is, for each residual block, different eigenvector matrices U and V are used. A transform coefficient matrix f obtained after performing SVD decomposition on a piece of residual data is a diagonal matrix, that is, all elements except a diagonal element are 0. Therefore, compression performance of residual data transformation can be improved significantly, so as to improve compression efficiency of coding. In addition, the eigenvector matrices U and V that are obtained by means of SVD decomposition are unit orthogonal matrices and therefore can be used for residual data transformation. Energy of the residual data before the transformation is the same as that of a transform coefficient after the transformation.

102. Perform transform processing on residual data by using the eigenvector matrices U and V of the prediction block to obtain a first transform coefficient of the residual data.

The residual data described in this embodiment of the present application may be, for example, a difference between a pixel value of the to-be-coded image block and a pixel value of the corresponding prediction block.

Specifically, the transform processing is performed on the residual data by using formula $f_1 = U \times C \times V$ to obtain the first transform coefficient of the residual data, where C is a residual data matrix, U is the eigenvector matrix U of the prediction block, V is the eigenvector matrix V of the prediction block, and A is the first transform coefficient of the residual data.

103. Code the first transform coefficient.

For example, entropy coding is performed on the first transform coefficient of the residual data, and a result of the coding is written to a bit stream.

In this embodiment of the present application, an encoder performs singular vector decomposition on a prediction block corresponding to a to-be-coded image block, to obtain eigenvector matrices U and V of the prediction block; performs transform processing on residual data by using the eigenvector matrices U and V of the prediction block to obtain a first transform coefficient of the residual data, where the residual data is a difference between a pixel value of the to-be-coded image block and a pixel value of the corresponding prediction block; and performs coding processing on the first transform coefficient, and sends the first transform coefficient obtained after the coding processing to a decoder. Therefore, the encoder does not need to transmit, to the decoder, a matrix U and a matrix V that are obtained by performing SVD decomposition on the residual data, and also does not need to transmit index values of several sets of matrices U and V to the decoder. This reduces identifier load of a coded bit stream and can improve coding efficiency.

Figure 2:
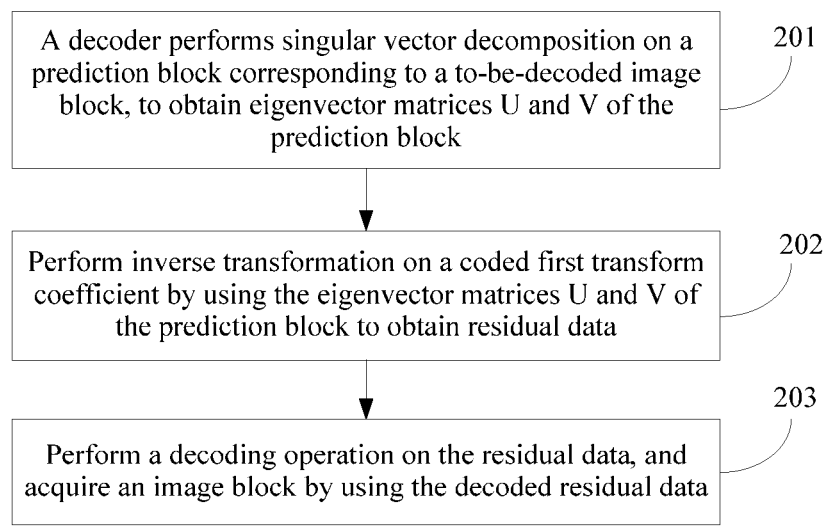
FIG. 2 is a schematic flowchart of an image decoding method according to an embodiment of the present application.

Based on the embodiment shown in FIG. 1, FIG. 2 is a schematic flowchart of an image decoding method according to an embodiment of the present application. As shown in FIG. 2, the method includes:

201. A decoder performs singular vector decomposition on a prediction block corresponding to a to-be-decoded image block, to obtain eigenvector matrices U and V of the prediction block.

The decoder acquires the prediction block corresponding to the image block, and performs singular vector decomposition on the prediction block to obtain the eigenvector matrices U and V of the prediction block. Reference may be made to the related description in the foregoing embodiment, and details are not repeatedly described herein.

202. Perform inverse transformation on a first transform coefficient by using the eigenvector matrices U and V of the prediction block to obtain residual data.

The residual data described in this embodiment of the present application may be, for example, a difference between a pixel value of the to-be-decoded image block and a pixel value of the corresponding prediction block.

Specifically, the inverse transformation processing is performed on the first transform coefficient by using formula $C = U \times f_1 \times V$ to obtain the residual data, where C is a residual data matrix, U is the eigenvector matrix U of the prediction block, V is the eigenvector matrix V of the prediction block, and $f_1$ is the first transform coefficient.

203. Perform a decoding operation on the residual data, and acquire an image block by using the decoded residual data.

For example, for an inter-frame prediction technology, entropy decoding is performed on a bit stream on which an encoder performs entropy coding, to obtain the decoded residual data. The bit stream on which the encoder performs the entropy coding further includes a partitioning manner and motion vector information of the image block. Therefore, the corresponding prediction block may be obtained according to the partitioning manner and the motion vector information of the image block. Then a value of a corresponding pixel point in the image block is obtained by adding a value of each pixel point in the prediction block and a value of a corresponding pixel point in the residual data.

For example, for an intra-frame prediction technology, entropy decoding is performed on a bit stream on which an encoder performs entropy coding, to obtain the decoded residual data. The bit stream on which the encoder performs the entropy coding further includes a partitioning manner of the image block. Therefore, the corresponding prediction block may be obtained according to the partitioning manner of the image block. Then a value of a corresponding pixel point in the image block is obtained by adding a value of each pixel point in the prediction block and a value of a corresponding pixel point in the residual data.

In this embodiment of the present application, a decoder only needs to perform singular vector decomposition on a prediction block corresponding to a to-be-decoded image block, to obtain eigenvector matrices U and V of the prediction block; perform inverse transformation on a first transform coefficient by using the eigenvector matrices U and V of the prediction block to obtain residual data; and perform a decoding operation on the residual data, and acquire a decoded image block by using the decoded residual data. An encoder does not need to transmit, to the decoder, a matrix U and a matrix V that are obtained by performing SVD decomposition on the residual data, and also does not need to transmit index values of several sets of matrices U and V to the decoder. This reduces identifier load of a coded bit stream and improves decoding efficiency.

Figure 3:
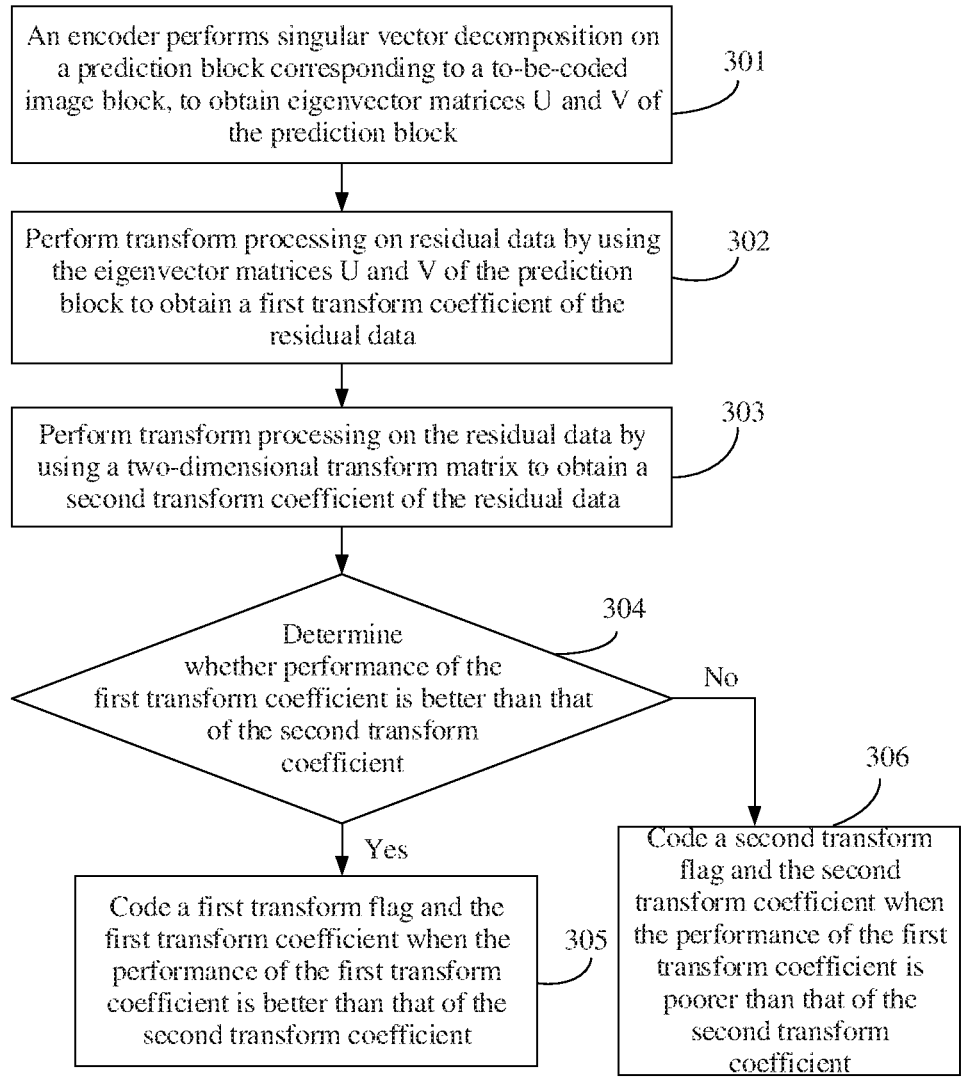
FIG. 3 is a schematic flowchart of an image coding method according to another embodiment of the present application.

FIG. 3 is a schematic flowchart of an image coding method according to another embodiment of the present application. As shown in FIG. 3, the method includes:

301. An encoder performs singular vector decomposition on a prediction block corresponding to a to-be-coded image block, to obtain eigenvector matrices U and V of the prediction block.

302. Perform transform processing on residual data by using the eigenvector matrices U and V of the prediction block to obtain a first transform coefficient of the residual data.

For the foregoing steps 301 and 302, reference may be made to the related description in the embodiment shown in FIG. 1.

303. Perform transform processing on the residual data by using a two-dimensional transform matrix to obtain a second transform coefficient of the residual data.

Specifically, the transform processing is performed on the residual data by using formula $f_2=T \times C \times T$ to obtain the second transform coefficient of the residual data, where C represents a residual data matrix, T represents a transform matrix, T represents a transposed matrix of the transform matrix, and represents the second transform coefficient of the residual data. The transform matrix may be, for example, a Discrete Cosine Trans (DCT) or Discrete Sine Transform (DST) matrix.

304. Determine whether performance of the first transform coefficient is better than that of the second transform coefficient, and if the performance of the first transform coefficient is greater than that of the second transform coefficient, perform step 305; if the performance of the first transform coefficient is not greater than that of the second transform coefficient, perform step 306.

For example, performance of a transform coefficient may be calculated according to a rate-distortion optimization (RDO) method. First, a quantity of bits required for coding the transform coefficient is calculated; then a reconstructed transform coefficient obtained after a process of coding and decoding the transform coefficient is calculated, and a decoded and reconstructed image block is obtained according to the reconstructed transform coefficient; a difference (distortion) between the image block and an original image block is calculated, and the performance of the transform coefficient is obtained according to the following RDO formula:

$$J = D + \lambda \times R,$$

where D represents the distortion. R represents the quantity of bits for the coding, and J represents final performance.

305. Code a first transform flag and the first transform coefficient when the performance of the first transform coefficient is better than that of the second transform coefficient.

The first transform flag and the first transform coefficient are coded when the performance of the first transform coefficient is better than that of the second transform coefficient, where the first transform flag is, for example, a first value used to indicate information that the encoder performs the transform processing on the residual data by using the eigenvector matrices U and V of the prediction block.

306. Code a second transform flag and the second transform coefficient when the performance of the first transform coefficient is poorer than that of the second transform coefficient.

The second transform flag and the second transform coefficient are coded when the performance of the first transform coefficient is poorer than that of the second transform coefficient, where the second transform flag is, for example, a second value used to indicate information that the encoder performs the transform processing on the residual data by using the two-dimensional transform matrix.

In this embodiment of the present application, when SVD decomposition is performed on a prediction block, a difference still exists between data of the prediction block and residual data, and therefore, in a particular case, residual data transformation by using matrices U and V that are obtained by performing SVD decomposition on the prediction block cannot necessarily obtain better performance than residual data transformation by using a two-dimensional transform matrix. Therefore, in this embodiment, an encoder compares performance obtained by the residual data transformation by using the matrices U and V that are obtained by perforating SVD decomposition on the prediction block with performance obtained by the residual data transformation by using the two-dimensional transform matrix. In addition, the encoder instructs, by using a transform flag, a decoder to use an inverse transformation manner corresponding to the transform flag, so as to obtain better transform performance.

Figure 4:
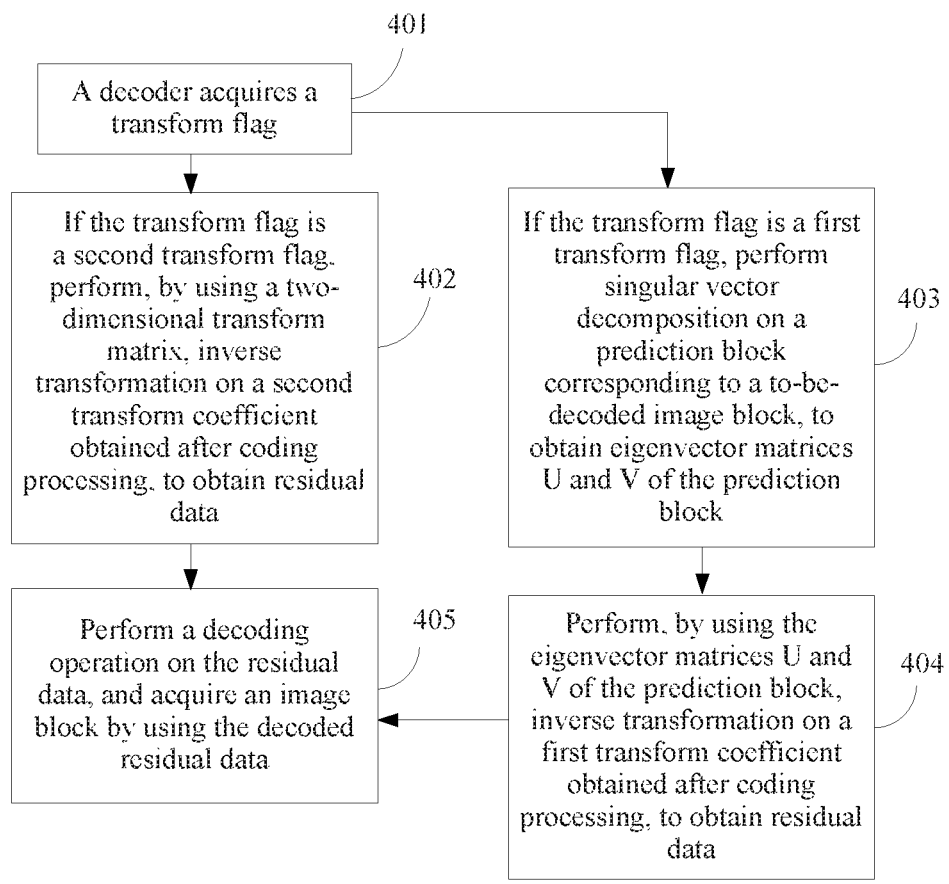
FIG. 4 is a schematic flowchart of an image decoding method according to another embodiment of the present application.

Based on the embodiment shown in FIG. 3, FIG. 4 is a schematic flowchart of an image decoding method according to another embodiment of the present application. As shown in FIG. 4, the method includes:

401. A decoder acquires a transform flag.

Specifically, the decoder obtains the transform flag by decoding a bit stream, where the transform flag includes a first transform flag or a second transform flag. For content of the first transform flag or the second transform flag, reference may be made to the descriptions in the foregoing embodiments.

Optionally, after step 401, the method includes:

402. If the transform flag is a second transform flag, perform, by using a two-dimensional transform matrix, inverse transformation on a second transform coefficient obtained after coding processing, to obtain residual data.

Specifically, it is assumed that the transform flag is the second transform flag, that is, an encoder performs transform processing on the residual data by using the two-dimensional transform matrix. In this case, the bit stream includes the second transform coefficient obtained after the encoder performs, by using the two-dimensional transform matrix, the transform processing on the residual data. Correspondingly, the decoder may perform, by using the two-dimensional transform matrix, inverse transformation on the second transform coefficient obtained after the coding processing, to obtain coded residual data. For example, the inverse transformation is performed by using formula $C=T \times f_2 \times T$ to obtain the residual data, where C represents a residual data matrix, T represents a transform matrix, T represents a transposed matrix of the transform matrix, and $f_2$ represents the second transform coefficient of the residual data.

Optionally, after step 401, the method further include:

403. If the transform flag is a first transform flag, perform singular vector decomposition on a prediction block corresponding to a to-be-decoded image block, to obtain eigenvector matrices U and V of the prediction block.

The decoder acquires the prediction block corresponding to the image block, and performs singular vector decomposition on the prediction block to obtain the eigenvector matrices U and V of the prediction block. Reference may be made to the related descriptions in the foregoing embodiments, and details are not repeatedly described herein.

404. Perform, by using the eigenvector matrices U and V of the prediction block, inverse transformation on a first transform coefficient obtained after coding processing, to obtain residual data.

Specifically, it is assumed that the transform flag after the decoding is the first transform flag, that is, information that the encoder performs transform processing on the residual data by using the eigenvector matrices U and V of the prediction block. In this case, an entropy-coded bit stream includes the first transform coefficient obtained after the encoder performs the transform processing on the residual data by using the eigenvector matrices U and V of the prediction block. Correspondingly, the decoder may perform, by using the eigenvector matrices U and V of the prediction block, inverse transformation on the first transform coefficient on which the encoder performs coding processing, to obtain coded residual data. For example, the inverse transformation processing is performed on the first transform coefficient by using formula $C=U \times f_1 \times V$ to obtain the coded residual data, where C is a residual data matrix, which is a residual data matrix obtained after the encoder performs the coding, U is the eigenvector matrix U of the prediction block, V is the eigenvector matrix V of the prediction block, and $f_1$ is the first transform coefficient of the residual data.

The method further includes after the foregoing steps 402 and 404:

405. Perform a decoding operation on the residual data, and acquire an image block by using the decoded residual data.

In this embodiment of the present application, when SVD decomposition is performed on a prediction block, a difference still exists between data of the prediction block and residual data, and therefore, in a particular case, residual data transformation by using matrices U and V that are obtained by performing SVD decomposition on the prediction block cannot necessarily obtain better performance than residual data transformation by using a two-dimensional transform matrix. Therefore, in this embodiment, an encoder compares performance obtained by the residual data transformation by using the matrices U and V that are obtained by performing SVD decomposition on the prediction block with performance obtained by the residual data transformation by using the two-dimensional transform matrix. In addition, the encoder instructs, by using a transform flag, a decoder to use an inverse transformation manner corresponding to the transform flag, so as to obtain better transform performance.

Figure 5:
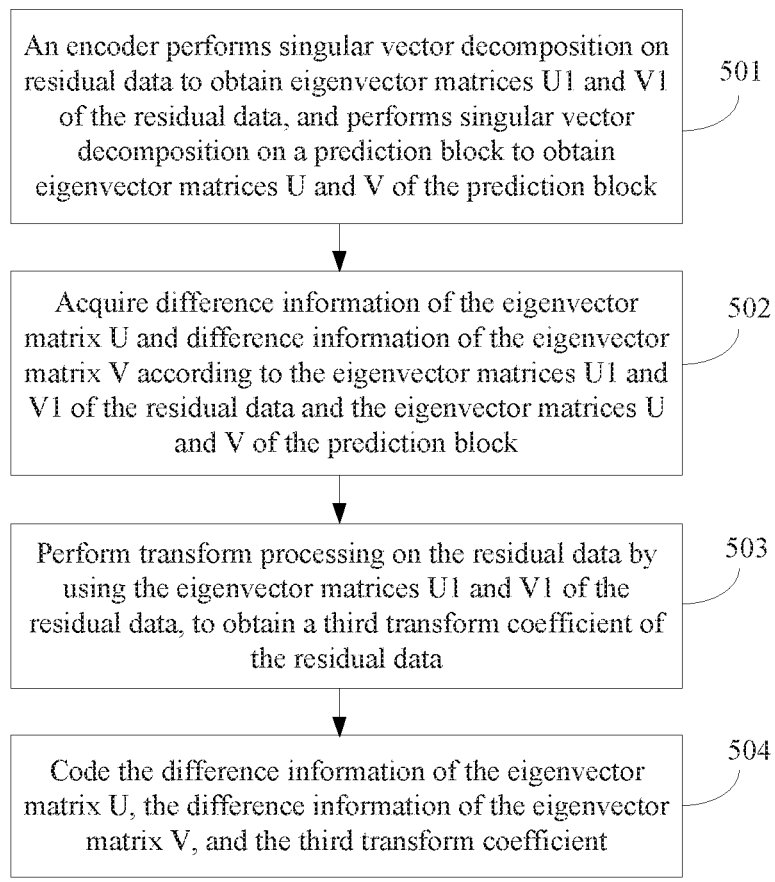
FIG. 5 is a schematic flowchart of an image coding method according to another embodiment of the present application.

FIG. 5 is a schematic flowchart of an image coding method according to another embodiment of the present application. As shown in FIG. 5, the method includes:

501. An encoder performs singular vector decomposition on residual data to obtain eigenvector matrices U1 and V1 of the residual data, and performs singular vector decomposition on a prediction block to obtain eigenvector matrices U and V of the prediction block.

For descriptions of acquiring the prediction block and of the singular vector decomposition, reference is made to the related descriptions in the foregoing embodiments.

502. Acquire difference information of the eigenvector matrix U and difference information of the eigenvector matrix V according to the eigenvector matrices U1 and V1 of the residual data and the eigenvector matrices U and V of the prediction block, and perform coding processing on the difference information of the eigenvector matrix U and the difference information of the eigenvector matrix V.

Specifically, a difference between the eigenvector matrix $U_1$ of the residual data and the eigenvector matrix U of the prediction block is used as the difference information $U_A$ of the eigenvector matrix U, that is, $U_A = U_1 - U$; and a difference between the eigenvector matrix $V_1$ of the residual data and the eigenvector matrix V of the prediction block is used as the difference information $V_A$ of the eigenvector matrix V, that is, $V_A = V_1 - V$.

503. Perform transform processing on the residual data by using the eigenvector matrices U1 and V1 of the residual data, to obtain a third transform coefficient of the residual data.

Specifically, the transform processing is performed on the residual data by using formula $f_3 = U_1 \times C \times V_1$ to obtain the third transform coefficient of the residual data, where C is a residual data matrix, $U_1$ is the eigenvector matrix $U_1$ of the residual data, $V_1$ is the eigenvector matrix $V_1$ of the residual data, and $f_3$ is the third transform coefficient of the residual data.

504. Code the difference information of the eigenvector matrix U, the difference information of the eigenvector matrix V, and the third transform coefficient.

The matrices U and V that are obtained by performing SVD decomposition on the prediction block have a relatively strong similarity with the matrices $U_1$ and $V_1$ that are obtained by performing SVD decomposition on the residual data. Therefore, in this embodiment, the encoder needs to code only the difference information $U_A$ of the eigenvector matrix U and the difference information $V_A$ of the eigenvector matrix V. This can reduce load of a coded bit stream and improve coding efficiency.

Figure 6:
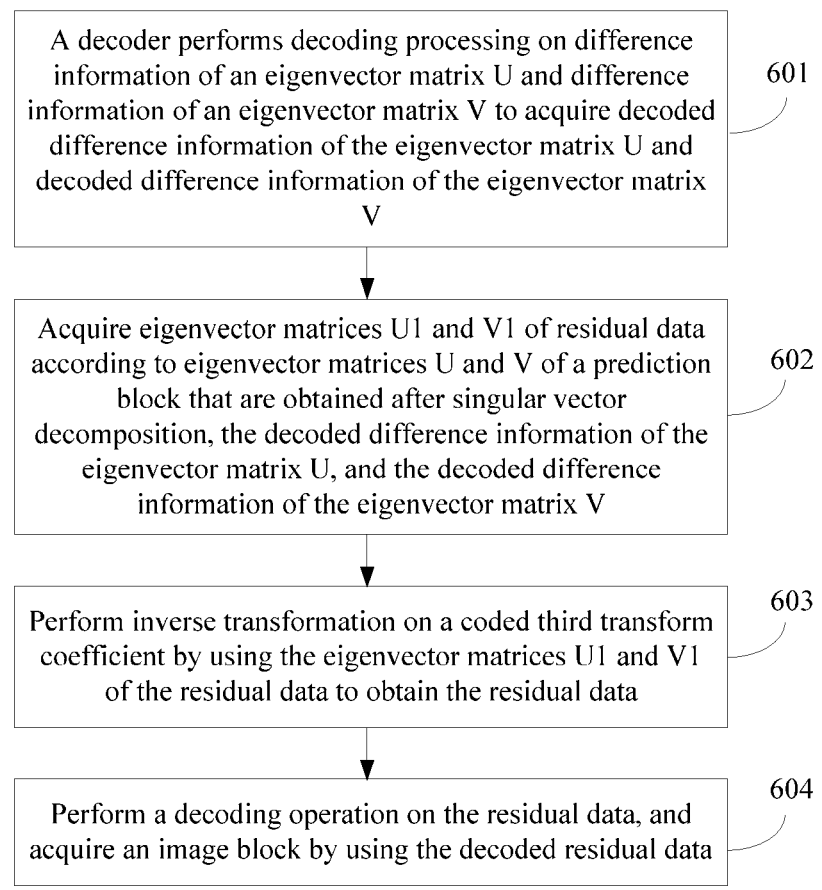
FIG. 6 is a schematic flowchart of an image decoding method according to another embodiment of the present application.

Based on the embodiment shown in FIG. 5, FIG. 6 is a schematic flowchart of an image decoding method according to another embodiment of the present application. As shown in FIG. 6, the method includes:

601. A decoder performs decoding processing on difference information of an eigenvector matrix U and difference information of an eigenvector matrix V to acquire decoded difference information of the eigenvector matrix U and decoded difference information of the eigenvector matrix V.

602. Acquire eigenvector matrices U1 and V1 of residual data according to eigenvector matrices U and V of a prediction block that are obtained after singular vector decomposition and according to the decoded difference information of the eigenvector matrix U and the decoded difference information of the eigenvector matrix V.

For an implementation process of obtaining the eigenvector matrices U and V of the prediction block after singular vector decomposition, reference may be made to the related descriptions in the foregoing embodiments.

Specifically, the eigenvector matrices $U_1$ and $V_1$ of the residual data may be obtained by using formulas $U_A=U_1-U$ and $V_A=V_1-V$.

603. Perform inverse transformation on a coded third transform coefficient by using the eigenvector matrices U1 and V1 of the residual data to obtain the residual data.

Specifically, the inverse transformation is performed on the third transform coefficient by using formula $C=U_1 \times f_3 \times V_1$ to obtain the residual data.

604. Perform a decoding operation on the residual data, and acquire an image block by using the decoded residual data.

In this embodiment, a decoder needs to acquire only difference information $U_A$ of an eigenvector matrix U and difference information $V_A$ of an eigenvector matrix V that are transmitted by an encoder, so that the decoder can obtain eigenvector matrices $U_1$ and $V_1$ of residual data according to eigenvector matrices U and V of a prediction block that are obtained after singular vector decomposition, and perform inverse transformation on a third transform coefficient by using the eigenvector matrices $U_1$ and $V_1$ of the residual data to obtain the residual data. This not only reduces load of a coded bit stream at the encoder, but also improves decoding efficiency.

Figure 7:
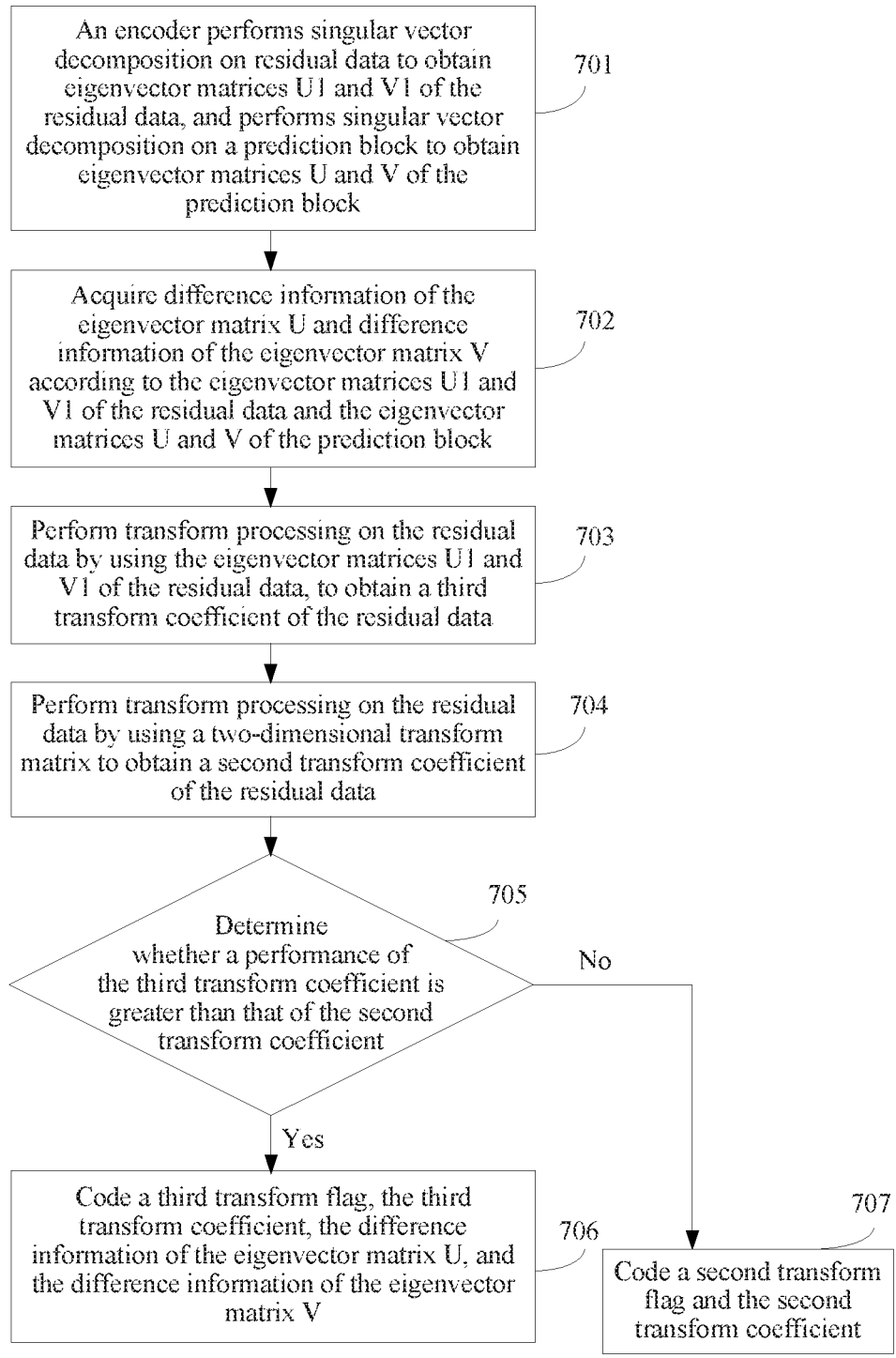
FIG. 7 is a schematic flowchart of an image coding method according to another embodiment of the present application.

FIG. 7 is a schematic flowchart of an image coding method according to another embodiment of the present application. As shown in FIG. 7, the method includes:

701. An encoder performs singular vector decomposition on residual data to obtain eigenvector matrices U1 and V1 of the residual data, and performs singular vector decomposition on a prediction block to obtain eigenvector matrices U and V of the prediction block.

For descriptions of acquiring the prediction block and of the singular vector decomposition, reference is made to the related descriptions in the foregoing embodiments.

702. Acquire difference information of the eigenvector matrix U and difference information of the eigenvector matrix V according to the eigenvector matrices U1 and V1 of the residual data and the eigenvector matrices U and V of the prediction block.

Specifically, a difference between the eigenvector matrix $U_1$ of the residual data and the eigenvector matrix U of the prediction block is used as the difference information $U_A$ of the eigenvector matrix U, that is, $U_A=U_1-U$; and a difference between the eigenvector matrix of the residual data and the eigenvector matrix V of the prediction block is used as the difference information $V_A$ of the eigenvector matrix V, that is, $V_A=V_1-V$.

703. Perform transform processing on the residual data by using the eigenvector matrices U1 and V1 of the residual data, to obtain a third transform coefficient of the residual data.

Specifically, the transform processing is performed on the residual data by using formula $f_3=U_1 \times C \times V_1$ to obtain the third transform coefficient of the residual data, where C is a residual data matrix, $U_1$ is the eigenvector matrix of the residual data, $V_1$ is the eigenvector matrix of the residual data, and $f_3$ is the third transform coefficient of the residual data.

For the foregoing steps 701 to 703, reference may be made to the related description in the embodiment shown in FIG. 5.

704. Perform transform processing on the residual data by using a two-dimensional transform matrix to obtain a second transform coefficient of the residual data.

Specifically, the transform processing is performed on the residual data by using formula $f_2=T \times C \times T'$ to obtain the second transform coefficient of the residual data, where C represents the residual data matrix, T represents a transform matrix, T' represents a transposed matrix of the transform matrix, and $f_2$ represents the second transform coefficient of the residual data.

705. Determine whether performance of the third transform coefficient is better than that of the second transform coefficient, and if the performance of the third transform coefficient is greater than that of the second transform coefficient, perform step 706; if the performance of the third transform coefficient is not greater than that of the second transform coefficient, perform step 707.

706. Code a third transform flag, the third transform coefficient, the difference information of the eigenvector matrix U, and the difference information of the eigenvector matrix V.

When the performance of the third transform coefficient is better than that of the second transform coefficient, the third transform flag, the third transform coefficient obtained after coding processing, and the difference information of the eigenvector matrix U and the difference information of the eigenvector matrix V are sent to a decoder, where the difference information of the eigenvector matrix U and the difference information of the eigenvector matrix V are obtained after coding processing, and the third transform flag is, for example, a third value used to indicate information that the encoder performs the transform processing on the residual data by using the eigenvector matrices U1 and V1 of the residual data.

707. Code a second transform flag and the second transform coefficient.

In this embodiment of the present application, a difference still exists between data of a prediction block and residual data, and therefore, in a particular case, residual data transformation by using matrices U1 and V1 that are obtained by performing SVD decomposition on the residual data cannot necessarily obtain better performance than residual data transformation by using a two-dimensional transform matrix. In addition, transmitting, by an encoder, difference information of an eigenvector matrix U and difference information of an eigenvector matrix V further increases load of a coded bit stream. Therefore, in this embodiment, the encoder compares performance obtained by the residual data transformation by using the eigenvector matrices U1 and V1 of the residual data with performance obtained by the residual data transformation by using the two-dimensional transform matrix. In addition, the encoder instructs, by using a transform flag, a decoder to use an inverse transformation manner corresponding to the transform flag, so as to obtain better transform performance. Meanwhile, in a particular case, this can reduce the load of the coded bit stream.

Figure 8:
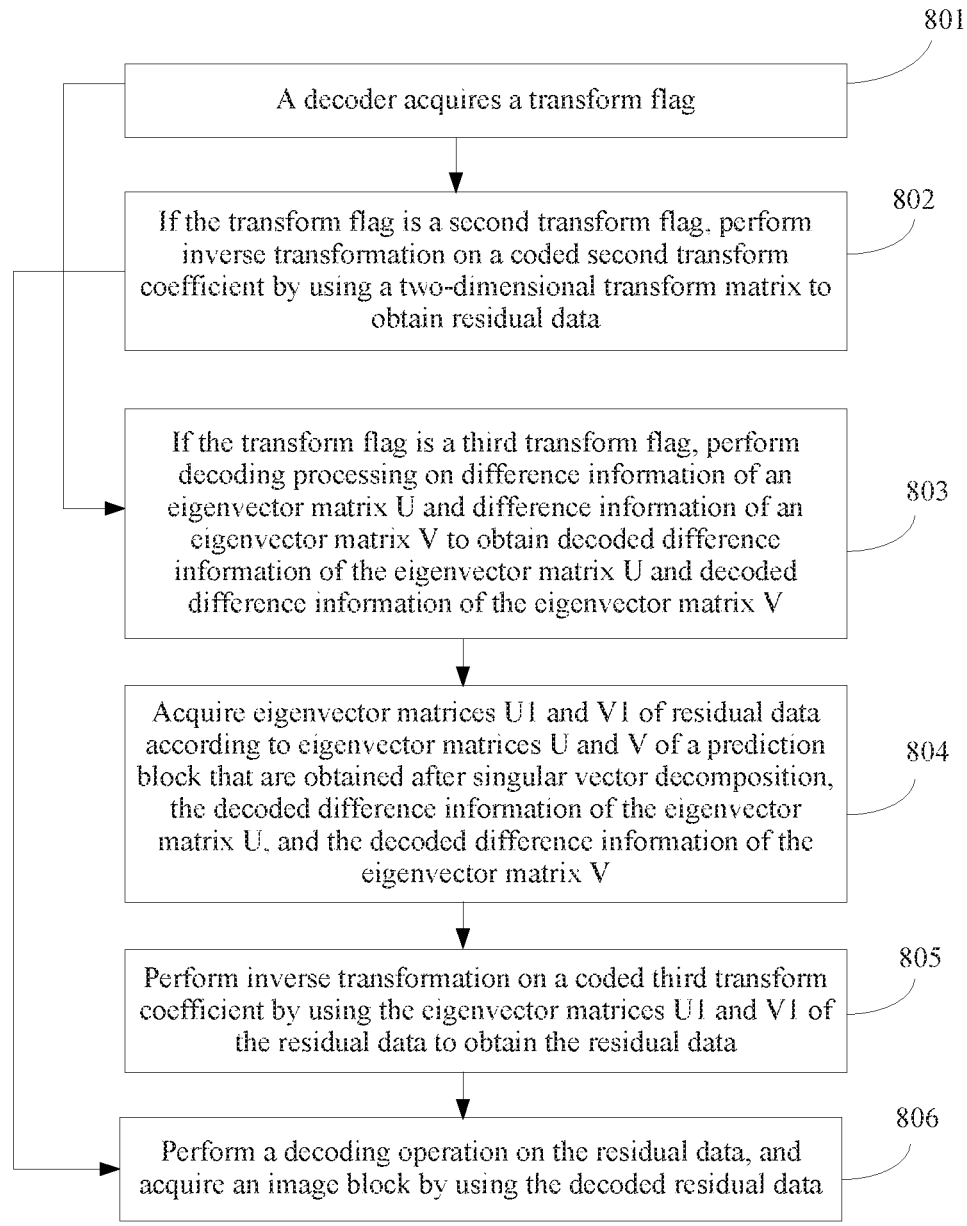
FIG. 8 is a schematic flowchart of an image decoding method according to another embodiment of the present application.

Based on the embodiment shown in FIG. 7, FIG. 8 is a schematic flowchart of an image decoding method according to another embodiment of the present application. As shown in FIG. 8, the method includes:

801. A decoder acquires a transform flag.

Specifically, the decoder obtains the transform flag by decoding a bit stream, where the transform flag includes a third transform flag or a second transform flag. For content of the third transform flag or the second transform flag, reference may be made to the descriptions in the foregoing embodiments.

Optionally, after step 801, the method includes:

802. If the transform flag is a second transform flag, perform inverse transformation on a coded second transform coefficient by using a two-dimensional transform matrix to obtain residual data.

Specifically, it is assumed that the decoded transform flag is the second transform flag, that is, an encoder performs transform processing on the residual data by using the two-dimensional transform matrix. In this case, an entropy-coded bit stream includes the second transform coefficient obtained after the encoder performs, by using the two-dimensional transform matrix, the transform processing on the residual data. Correspondingly, the decoder may perform, by using the two-dimensional transform matrix, inverse transformation on the second transform coefficient obtained after the coding processing, to obtain coded residual data. For example, the inverse transformation is performed by using formula C=T×f$_2$×T' to obtain the residual data, where C represents a residual data matrix, T represents a transform matrix, T' represents a transposed matrix of the transform matrix, and f$_2$ represents the second transform coefficient of the residual data.

Optionally, after step 801, the method further include:

803. If the transform flag is a third transform flag, perform decoding processing on difference information of an eigenvector matrix U and difference information of an eigenvector matrix V to obtain decoded difference information of the eigenvector matrix U and decoded difference information of the eigenvector matrix V.

804. Acquire eigenvector matrices U1 and V1 of residual data according to eigenvector matrices U and V of a prediction block that are obtained after singular vector decomposition and according to the decoded difference information of the eigenvector matrix U and the decoded difference information of the eigenvector matrix V.

For an implementation process of obtaining the eigenvector matrices U and V of the prediction block after singular vector decomposition, reference may be made to the related descriptions in the foregoing embodiments.

Specifically, the eigenvector matrices U$_1$ and V$_1$ of the residual data may be obtained by using formulas U$_A$=U$_1$−U and V$_A$=V$_1$−V.

805. Perform inverse transformation on a coded third transform coefficient by using the eigenvector matrices U1 and V1 of the residual data to obtain the residual data.

Specifically, the inverse transformation is performed, by using formula C=U$_1$×f$_3$×V$_1$, on the third transform coefficient that is sent by the encoder after coding processing, to obtain coded residual data.

Optionally, after step 802 and step 805, the method further includes:

806. Perform a decoding operation on the residual data, and acquire an image block by using the decoded residual data.

In this embodiment of the present application, a difference still exists between data of a prediction block and residual data, and therefore, in a particular case, residual data transformation by using matrices U1 and V1 that are obtained by performing SVD decomposition on the residual data cannot necessarily obtain better performance than residual data transformation by using a two-dimensional transform matrix. In addition, transmitting, by an encoder, difference information of an eigenvector matrix U and difference information of an eigenvector matrix V further increases load of a coded bit stream. Therefore, in this embodiment, the encoder compares performance obtained by the residual data transformation by using the eigenvector matrices U1 and V1 of the residual data with performance obtained by the residual data transformation by using the two-dimensional transform matrix. In addition, the encoder instructs, by using a transform flag, a decoder to use an inverse transformation manner corresponding to the transform flag, so as to obtain better transform performance. Meanwhile, in a particular case, this can reduce the load of the coded bit stream.

Figure 9:
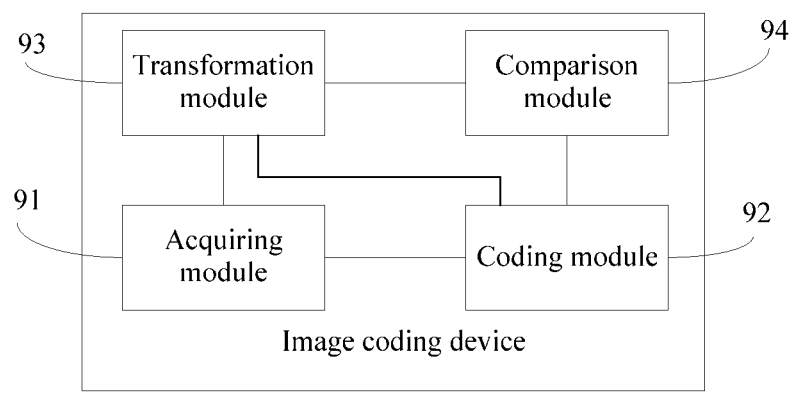
FIG. 9 is a schematic structural diagram of an image coding device according to another embodiment of the present application.

FIG. 9 is a schematic structural diagram of an image coding device according to another embodiment of the present application. As shown in FIG. 9, the device includes:

an acquiring module 91, configured to perform singular vector decomposition on a prediction block corresponding to a to-be-coded image block, to obtain eigenvector matrices U and V of the prediction block; and a coding module 92, configured to perform coding processing on residual data according to the eigenvector matrices U and V of the prediction block, where the residual data is a difference between a pixel value of the to-be-coded image block and a pixel value of the corresponding prediction block.

Optionally, the image coding device further includes:

a transformation module 93, configured to perform first transformation on the residual data by using the eigenvector matrices U and V of the prediction block to obtain a first transform coefficient of the residual data.

Optionally, the coding module 92 is specifically configured to:

perform coding processing on the first transform coefficient obtained by the transformation module 93.

Optionally, the transformation module 93 is further configured to perform second transformation on the residual data by using a two-dimensional transform matrix to obtain a second transform coefficient of the residual data.

Optionally, the image coding device further includes:

a comparison module 94, configured to compare performance of the first transform coefficient and that of the second transform coefficient, where the first transform coefficient and the second transform coefficient are obtained by the transformation module 93; and the coding module 92 is specifically configured to: if the comparison module 94 obtains, by means of comparison, that the performance of the first transform coefficient is better than that of the second transform coefficient, code a transform flag and the first transform coefficient, where a value of the transform flag is a first value used to indicate that an encoder transforms the residual data by using the eigenvector matrices U and V of the prediction blocks; or the coding module 92 is specifically configured to: if the performance of the first transform coefficient is poorer than that of the second transform coefficient, code a transform flag and the second transform coefficient, where a value of the transform flag is a second value used to indicate that an encoder transforms the residual data by using the two-dimensional transform matrix.

Optionally, the acquiring module 91 is further configured to perform singular vector decomposition on the residual data to obtain eigenvector matrices U and V of the residual data;

the acquiring module 91 is further configured to acquire information about a difference between the eigenvector matrix U of the residual data and the eigenvector matrix U of the prediction block and information about a difference between the eigenvector matrix V of the residual data and the eigenvector matrix V of the prediction block according to the eigenvector matrices U and V of the residual data and the eigenvector matrices U and V of the prediction block;

the coding module 92 is further configured to code the information about the difference between the eigenvector matrices U and the information about the difference between the eigenvector matrices V;

the transformation module 93 is further configured to perform third transformation on the residual data by using the eigenvector matrices U and V of the residual data to obtain a third transform coefficient of the residual data; and the coding module 92 is further configured to perform coding processing on the third transform coefficient.

Optionally, the comparison module 94 is further configured to compare performance of the second transform coefficient and that of the third transform coefficient; and the coding module 92 is further configured to: if the performance of the third transform coefficient is better than that of the second transform coefficient, code a transform flag, the third transform coefficient, the information about the difference between the eigenvector matrices U, and the information about the difference between the eigenvector matrices V, where a value of the transform flag is a third value used to indicate that an encoder transforms the residual data by using the eigenvector matrices U and V of the residual data; or the coding module 92 is further configured to: if the performance of the third transform coefficient is poorer than that of the second transform coefficient, code a transform flag and the second transform coefficient, where a value of the transform flag is a second value used to indicate that an encoder transforms the residual data by using the two-dimensional transform matrix.

The foregoing transform flag may be a 1-bit flag, and the first value, the second value, and the third value may be 0 or 1.

For a technical principle and a technical effect of the apparatus in this embodiment, reference may be made to the detailed content in the image coding/decoding method described in any one of FIG. 1 to FIG. 8, and details are not repeatedly described herein.

Figure 10:
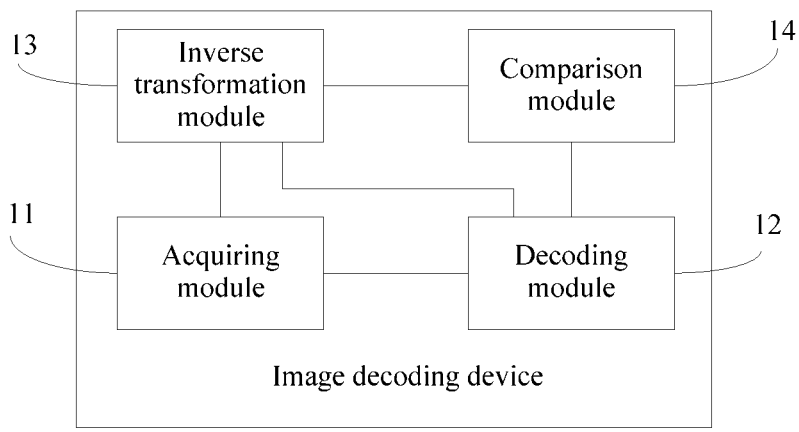
FIG. 10 is a schematic structural diagram of an image decoding device according to another embodiment of the present application.

FIG. 10 is a schematic structural diagram of an image decoding device according to another embodiment of the present application. As shown in FIG. 10, the device includes:

an acquiring module 11, configured to perform singular vector decomposition on a prediction block corresponding to a to-be-decoded image block, to obtain eigenvector matrices U and V of the prediction block; and a decoding module 12, configured to obtain a transform coefficient, and perform decoding processing on the transform coefficient according to the eigenvector matrices U and V of the prediction block.

Optionally, the image decoding device further includes:
an inverse transformation module 13, configured to perform inverse transformation on the transform coefficient by using the eigenvector matrices U and V of the prediction block to obtain residual data; and the decoding module 12 is configured to obtain an image block by using the residual data obtained by the inverse transformation module 13.

Optionally, the inverse transformation module 13 is configured to decode a transform flag, where if a value of the transform flag is a first value, inverse transformation is performed on the transform coefficient by using the eigenvector matrices U and V of the prediction block.

The inverse transformation module 13 is further configured to: decode a transform flag, where when the transform flag equals a second value, inverse transformation is performed on the transform coefficient by using a two-dimensional transform matrix to obtain the residual data.

Optionally, the decoding module 12 is further configured to decode difference information of the eigenvector matrix U and difference information of the eigenvector matrix V;

the acquiring module 11 is further configured to acquire the eigenvector matrices U and V according to the eigenvector matrices U and V of the prediction block that are obtained after the singular vector decomposition and the decoded difference information of the eigenvector matrix U and the decoded difference, information of the eigenvector matrix V; and the inverse transformation module 13 is further configured to perform inverse transformation on the transform coefficient by using the eigenvector matrices U and V to obtain the residual data.

Optionally, the inverse transformation module 13 is further configured to decode the transform flag, where when the transform flag equals a third value, inverse transformation is performed on the transform coefficient by using the eigenvector matrices U and V; or when the transform flag equals the second value, inverse transformation is performed on the transform coefficient by using the two-dimensional transform matrix.

For a technical principle and a technical effect of the apparatus in this embodiment, reference may be made to the detailed content in the image coding/decoding method described in any one of FIG. 1 to FIG. 8, and details are not repeatedly described herein.

An embodiment of the present application further provides an image coding device, including a memory and a processor, where the memory and the processor are connected by using a communications bus, the memory stores instructions for implementing the image coding methods described in the foregoing embodiments, and when calling the instructions in the memory, the processor can perform the image coding methods described in the foregoing embodiments. A technical principle and a technical effect of the implementation are not repeatedly described herein.

An embodiment of the present application further provides an image decoding device, including a memory and a processor, where the memory and the processor are connected by using a communications bus, the memory stores instructions for implementing the image decoding methods described in the foregoing embodiments, and when calling the instructions in the memory, the processor can perform the image decoding methods described in the foregoing embodiments. A technical principle and a technical effect of the implementation are not repeatedly described herein.

An embodiment of the present application further provides an image coding/decoding system, including: the image coding device described in the embodiment shown in FIG. 9 and the image decoding device described in the embodiment shown in FIG. 10, and detailed content is not repeatedly described herein.

In the several embodiments provided in this application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The foregoing integrated unit may be implemented in a form of hardware, or may be implemented in a form of hardware in addition to a software functional unit.

When the foregoing integrated unit is implemented in a form of a software functional unit, the integrated unit may be stored as code in a computer-readable storage medium. The foregoing code is stored in a computer-readable storage medium and includes several instructions that are used by a processor or a hardware circuit to execute a part of or all steps of the method in each embodiment of the present application. The storage medium may be any medium capable of storing program code, such as a high-capacity miniature removable storage disk having a universal serial bus interface without a physical drive, a portable hard drive, a read only memory (ROM), a random access memory (RAM), a magnetic disk, or a CD-ROM.

Finally, it should be noted that the foregoing embodiments are merely intended to describe the technical solutions of the present application, but not to limit the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. An image decoding method, comprising:
    performing, by a processor included in an image decoding device, singular vector decomposition on a prediction block corresponding to a to-be-decoded image block, to obtain eigenvector matrices U and V of the prediction block;
    obtaining, by the processor, a transform coefficient;
    decoding, by the processor, difference information of the eigenvector matrix U and difference information of the eigenvector matrix V, wherein the difference information of the eigenvector matrix U is difference information between an eigenvector matrix U of residual data and the eigenvector matrix U of the prediction block obtained after the singular vector decomposition, and wherein the difference information of the eigenvector matrix V is difference information between an eigenvector matrix V of the residual data and the eigenvector matrix V of the prediction block obtained after the singular vector decomposition;
    acquiring, by the processor, the eigenvector matrices U and V of the residual data according to the eigenvector matrices U and V of the prediction block and the decoded difference information of the eigenvector matrix U and the decoded difference information of the eigenvector matrix V;
    performing, by the processor, an inverse transformation on the transform coefficient based on the eigenvector matrices U and V of the residual data to obtain the residual data; and
    obtaining an image block based on the residual data.

2. The method according to claim 1, wherein before the obtaining the image block based on the residual data, further comprising:
    decoding a transform flag, wherein in response to determining that a value of the transform flag is a first value, an inverse transformation is performed on the transform coefficient based on the eigenvector matrices U and V of the prediction block.

3. The method according to claim 1, wherein before the obtaining the image block based on the residual data, further comprising:
    decoding a transform flag, wherein in response to determining that the transform flag equals a second value, an inverse transformation is performed on the transform coefficient based on a two-dimensional transform matrix to obtain the residual data.

4. The method according to claim 1, further comprising:
    decoding a transform flag,
    wherein in response to determining that the transform flag equals a third value, performing an inverse transformation on the transform coefficient based on the eigenvector matrices U and V of the residual data.

5. The method according to claim 4, wherein in response to determining that the transform flag equals a second value, performing an inverse transformation on the transform coefficient based on a two-dimensional transform matrix.

6. A computer program product comprising a non-transitory computer-readable medium storing computer executable instructions that when executed by a processor instruct the processor to:
    perform singular vector decomposition on a prediction block corresponding to a to-be-decoded image block, to obtain eigenvector matrices U and V of the prediction block;
    obtain a transform coefficient;
    decode difference information of the eigenvector matrix U and difference information of the eigenvector matrix V, wherein the difference information of the eigenvector matrix U is difference information between an eigenvector matrix U of residual data and the eigenvector matrix U of the prediction block obtained after the singular vector decomposition, and wherein the difference information of the eigenvector matrix V is difference information between an eigenvector matrix V of the residual data and the eigenvector matrix V of the prediction block obtained after the singular vector decomposition;
    acquire the eigenvector matrices U and V of the residual data according to the eigenvector matrices U and V of the prediction block and the decoded difference information of the eigenvector matrix U and the decoded difference information of the eigenvector matrix V;

perform an inverse transformation on the transform coefficient based on the eigenvector matrices U and V of the residual data to obtain the residual data; and obtain an image block based on the residual data.

7. The computer program product according to claim 6, wherein the processor is further configured to execute the instructions to:

decode a transform flag, wherein in response to determining that a value of the transform flag is a first value, an inverse transformation is performed on the transform coefficient based on the eigenvector matrices U and V of the prediction block.

8. The computer program product according to claim 6, wherein the processor is further configured to execute the instructions to:

decode a transform flag, wherein in response to determining that the transform flag equals a second value, an inverse transformation is performed on the transform coefficient based on a two-dimensional transform matrix to obtain the residual data.

9. The computer program product according to claim 6, wherein the processor is further configured to execute the instructions to:

decode a transform flag, wherein in response to determining that the transform flag equals a third value, an inverse transformation is performed on the transform coefficient based on the eigenvector matrices U and V of the residual data.

10. The computer program product according to claim 9, wherein in response to determining that the transform flag equals a second value, an inverse transformation is performed on the transform coefficient based on a two-dimensional transform matrix.

11. A device, comprising:

a processor; and a memory storing computer executable instructions that when executed by the processor instruct the processor to:

perform singular vector decomposition on a prediction block corresponding to a to-be-decoded image block, to obtain eigenvector matrices U and V of the prediction block;

obtain a transform coefficient;

decode difference information of the eigenvector matrix U and difference information of the eigenvector matrix V, wherein the difference information of the eigenvector matrix U is difference information between an eigenvector matrix U of residual data and the eigenvector matrix U of the prediction block obtained after the singular vector decomposition, and wherein the difference information of the eigenvector matrix V is difference information between an eigenvector matrix V of the residual data and the eigenvector matrix V of the prediction block obtained after the singular vector decomposition:

acquire the eigenvector matrices U and V of the residual data according to the eigenvector matrices U and V of the prediction block and the decoded difference information of the eigenvector matrix U and the decoded difference information of the eigenvector matrix V;

perform an inverse transformation on the transform coefficient based on the eigenvector matrices U and V of the residual data to obtain the residual data; and obtain an image block based on the residual data.

12. The device according to claim 11, wherein the processor is further configured to execute the instructions to:

decode a transform flag, wherein in response to determining that a value of the transform flag is a first value, an inverse transformation is performed on the transform coefficient based on the eigenvector matrices U and V of the prediction block.

13. The device according to claim 11, wherein the processor is further configured to execute the instructions to:

decode a transform flag, wherein in response to determining that the transform flag equals a second value, an inverse transformation is performed on the transform coefficient based on a two-dimensional transform matrix to obtain the residual data.

14. The device according to claim 11, wherein the processor is further configured to execute the instructions to:

decode a transform flag, wherein in response to determining that the transform flag equals a third value, an inverse transformation is performed on the transform coefficient based on the eigenvector matrices U and V of the residual data.

15. The device according to claim 14, wherein in response to determining that the transform flag equals a second value, an inverse transformation is performed on the transform coefficient based on a two-dimensional transform matrix.

* * * * *